(No Model.)

J. A. BOWDEN.
FILTER MANIPULATING VALVE.

No. 450,133. Patented Apr. 14, 1891.

WITNESSES
W. G. Hodge
A. Cuningham

INVENTOR
Junius A. Bowden
By Wells W. Leggett & Co.
Attorneys.

UNITED STATES PATENT OFFICE.

JUNIUS A. BOWDEN, OF DETROIT, MICHIGAN.

FILTER-MANIPULATING VALVE.

SPECIFICATION forming part of Letters Patent No. 450,133, dated April 14, 1891.

Application filed October 28, 1890. Serial No. 369,546. (No model.)

*To all whom it may concern:*

Be it known that I, JUNIUS A. BOWDEN, a citizen of the United States, residing at Detroit, county of Wayne, State of Michigan, have invented a certain new and useful Improvement in Filter-Manipulating Valves; and I declare the following to be a full, clear, and exact description of the same, such as will enable others skilled in the art to which it pertains to make and use the same, reference being had to the accompanying drawings, which form a part of this specification.

Figure 1:
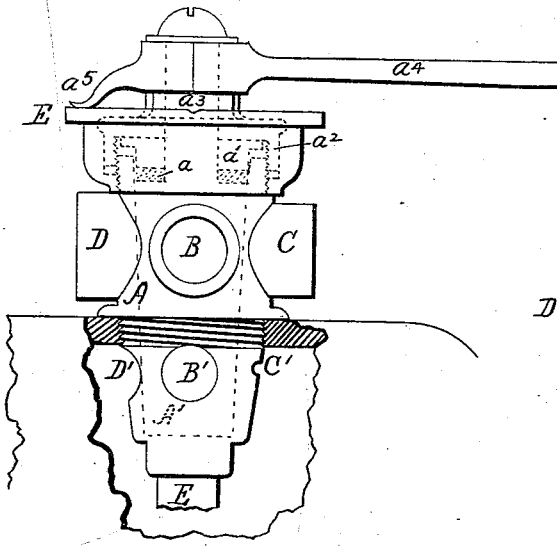
Figure 2:
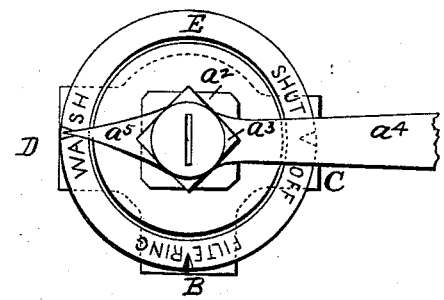
Figure 3:
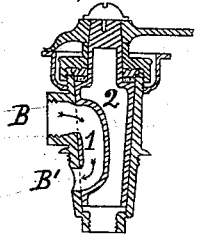
Figure 5:
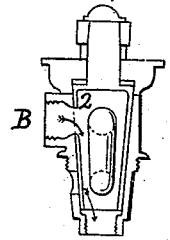
Figure 7:
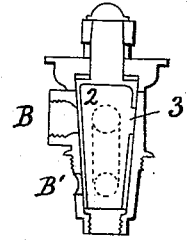
Figure 4:
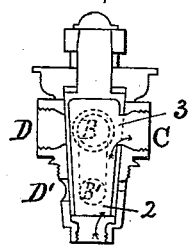
Figure 6:
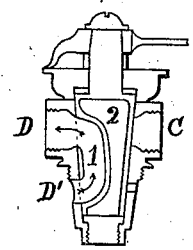
Figure 8:
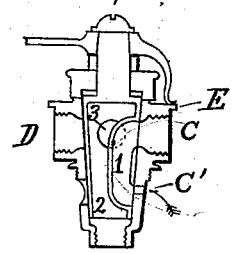

In the drawings, Figure 1 is a front elevation of a device embodying my invention and illustrated as in place in the top of a filter. Fig. 2 is a plan view of the same. Fig. 3 is a central section by a vertical plane passed through the water-inlet, with the valve in position for filtering. Fig. 4 is a section at right angles thereto, with the valve in the same position. Fig. 5 is a central section by a vertical plane passed through the water-inlet with the valve in position to reverse the current through the filter-bed and so cleanse the same. Fig. 6 is a view at right angles thereto, with the valve in the same position. Fig. 7 is a section by a central vertical plane passed through the water-inlet, with the valve in position to shut off the water from the filter. Fig. 8 is a section by a plane at right angles thereto, with the valve in the same position, and illustrating also the index-disk cast solid with the body of the valve.

The object of my invention is to provide a novel, simple, and economical valve, which is adapted to admit water to the filter and drain off the filtered water therefrom; also to admit water beneath the filter-bed for washing the same and to draw off the wash-water therefrom; also to wholly cut off the supply of water to the filter and the exit therefrom; also to prevent an accumulation of any great pressure in the filter when the water-inlet has been cut off, due to any slight leakage about the inlet-valve. To this end, A is the valve-case.

B represents the water-inlet, C the filtered-water outlet, and D the drain-outlet or wash-water outlet.

A' is the valve-plug proper. It is packed at $a$ and provided with a follower $a'$ and a binding-cap $a^2$. Its stem $a^3$ is squared at its top and provided with a suitable handle $a^4$ and an index-finger $a^5$.

E is an indicating-disk, which may be screwed onto the valve-case, as shown in Fig. 1, or it may be cast solid therewith, as shown in Fig. 8. It is provided with suitable indications, as shown in Fig. 2. Thus, for instance, the word "Wash" may be over the drain-exit or wash-water exit, while the word "Filtering" and the words "Shut off" may be located in proper positions determining the corresponding points upon which the index-finger $a^5$ must rest for accomplishing any one of these objects. Thus, if it is desired to shut off all the inlet and outlet passages, the valve may be turned until the index-finger rests at the point marked "Shut off."

If it is desired to operate the filter by admitting feed-water thereto and permitting the same to pass off through the filtered-water orifice, then the valve is turned so that its index-finger $a^5$ shall rest over the point marked "Filtering," and which also operates to close the drain-pipe orifice. On the other hand, if it is desired to wash the filter-bed and to that end direct the water beneath the filter-bed, close off the filtered-water outlet, and open the drain-pipe for the wash-water to pass off, then the valve is turned so that the index-finger rests over the point marked "Wash."

I will now proceed to describe the relative positions of the ports in the valve-plug and valve-case. The valve-plug is provided with two passages. The first I will designate by the numeral 1. It extends from the zone opposite the ports B, C, and D, outside of the filter down to the zone of the orifices B' and D' within the filter, simply entering the side of the plug-valve at the upper zone and coming out at the side of the plug-valve on the level of the lower zone. The other passage is indicated by the numeral 2. It extends from the base of the plug-valve, and has a single opening 3 at the upper zone in a direction at right angles to passage 1.

E is a pipe leading from the bottom of the plug-valve down to a point beneath the filter-bed.

The operation of the device is as follows: When it is desired to operate the filter for filtering water, the index-finger is moved to rest over the point marked "Filtering." The passage 1 then connects at its upper and lower ends with the water-inlet B and the orifice B', and the passage 2 has its orifice 3 opposite the filtered-water outlet C, while the orifices D and D' are closed. Water now entering at B passes out at B' into the filter above the filter-bed, as shown in Fig. 3. It passes thence down through the filter-bed, and the filtered water rises through the pipe E and through the passage 2 out of the orifice 3 and the filtered-water outlet C, as shown in Fig. 4. If now it is desired to wash the filter-bed, and for this purpose to reverse the current from the filter, the plug-valve is turned, so that the index-finger $a^5$ rests over the point marked "Wash." The relative position of the valve and the ports is now illustrated in Figs. 5 and 6. Water entering at B passes down through the passage 2, thence down through the pipe E, beneath the filter-bed. It then rises through the filter-bed in the reverse direction, and passes into the port D', thence through passage 1 in the plug-valve and out of the drain or wash-water exit D. During this operation the filtered-water outlet remains closed. If now it is desired to shut off the filter, so that all of the ports leading into and out from the same are closed, the plug-valve is turned, so that the index-finger rests over the point marked "Shut off." This leaves the valve and its ports in the relative position shown in Figs. 7 and 8. The water-inlet port is closed and the drain-outlet. So, also, the filtered-water outlet is closed by reason of the fact that the lower end of the passage 1 is closed. It is apparent, however, that should there be any leakage about the water-inlet pipe, water might be forced in slowly therethrough sufficient to produce a considerable pressure within the filter. To avoid any liability of injury from this cause, I provide the valve-case with a small pressure-relief orifice C', which will communicate with the base of the passage 1. This enables enough water to escape to prevent such accumulation of pressure, while the filtered-water outlet remains practically closed. This latter orifice may or may not be employed.

The valve-case A is constructed at a point intermediate the outside set of ports B C D and the inside set of ports B' D', in such manner as to engage the filter, whereby a part of the body of the valve-case is placed inside the filter and a part of such body is placed outside thereof. As here shown, the said intermediate engagement of the valve-case with the filter is effected by screw-threads on the exterior of the valve-case engaging a screw-threaded socket in the filter, Fig. 1.

The construction and arrangement of the parts comprising my improved valve are such that the passages 1 and 2 run lengthwise of the rotary valve-plug, and the set of ports B C D are outside the filter, while the set B' D' and the relief-orifice C' are inside the filter. In these respects my valve differs from a filter-valve located bodily outside the filter and connected therewith by several pipe-branches. It is apparent that by this contrivance the filter need be adapted for but this single valve, and that by it all of the operations of filtering, washing, and cutting off may be properly accomplished.

What I claim is—

1. A filter-valve consisting of a valve-case adapted to be tapped into a filter and provided with a water-inlet B' and a drain-outlet D', both arranged at a point inside the filter, and a water-inlet B, filtered outlet C, and drain-outlet D, all located at a point outside the filter, and a rotating valve-plug A', having the water-passage 1, extending lengthwise of the plug from the zone opposite the inlet B and outlets C D outside of the filter to the zone of the inlet B' and outlet D' inside of the filter, and the water-passage 2, extending lengthwise of the plug from the base thereof, and having the opening 3 at an angle to the passage 1 at the zone of the inlets and outlets B C D, substantially as described.

2. A filter-valve consisting of a valve-case having the ports B C D at its outer end portion and the ports B' D' at its inner end portion, and between such outer and inner ports constructed to engage a filter to place the two sets of ports respectively outside and inside the filter, and a rotating valve-plug A', having the passage 1, running lengthwise thereof from the zone of the outside set of ports to the zone of the inside set, and the passage 2, extending lengthwise of the plug from the inner end thereof to the zone of the outside set of ports, substantially as described.

3. A filter-valve consisting of a valve-case having the outer set of ports B C D, the inner set of ports B' D', and the externally-threaded portion intermediate the two sets of ports, and a rotary valve-plug A', having the passage 1 running lengthwise of the plug from the zone of the outer to the zone of the inner set of ports, and the passage 2 running lengthwise from its base to the zone of the outer set of ports, substantially as described.

4. A filter-valve consisting of a valve-case provided with the ports B C D at its outer end portion and the ports B' D' and relief-orifice C' at its inner end portion, and between such outer and inner ports constructed to engage a filter, and a rotating valve-plug A', having a passage 1 running lengthwise from the zone of the outer set of ports to the relief-orifice and the zone of the inner set of ports, and a passage 2, extending from the inner end of the plug to the zone of the outer set of ports, substantially as described.

In testimony whereof I sign this specification in the presence of two witnesses.

JUNIUS A. BOWDEN.

Witnesses:
 MARION A. REEVE,
 W. H. CHAMBERLIN.